(12) United States Patent
Tomita et al.

(10) Patent No.: US 9,325,214 B2
(45) Date of Patent: Apr. 26, 2016

(54) ELECTRIC POWER COLLECTION AND DISTRIBUTION RING AND ELECTRIC MOTOR

(71) Applicant: Hitachi Metals, Ltd., Tokyo (JP)

(72) Inventors: Kazuhiko Tomita, Mito (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 241 days.

(21) Appl. No.: 14/073,352

(22) Filed: Nov. 6, 2013

(65) Prior Publication Data

US 2014/0132101 A1 May 15, 2014

(30) Foreign Application Priority Data

Nov. 9, 2012 (JP) ................. 2012-247197

(51) Int. Cl.
*H02K 13/00* (2006.01)
*H02K 3/52* (2006.01)

(52) U.S. Cl.
CPC ............ *H02K 3/522* (2013.01); *H02K 2203/09* (2013.01)

(58) Field of Classification Search
CPC .... H02K 3/522; H02K 2203/09; H02K 13/00
USPC .................................................. 310/146, 71
See application file for complete search history.

(56) References Cited

U.S. PATENT DOCUMENTS

| 8,193,677 | B2* | 6/2012 | Murakami | H02K 3/522 310/195 |
| 2003/0094879 | A1* | 5/2003 | Kobayashi | H02K 3/522 310/238 |
| 2004/0066103 | A1* | 4/2004 | Ohuchi | H02K 3/50 310/71 |
| 2004/0070293 | A1* | 4/2004 | Kabasawa | H02K 3/522 310/71 |
| 2007/0004249 | A1* | 1/2007 | Uchiyama | H02K 3/505 439/76.2 |
| 2009/0256439 | A1* | 10/2009 | Inoue | H02K 3/522 310/71 |

FOREIGN PATENT DOCUMENTS

| JP | 2003-134759 | 5/2003 |
| JP | 2005057932 | 3/2005 |

OTHER PUBLICATIONS

Japanese Office Action for application No. 2012247197 dated Nov. 4, 2015 and English translation.

* cited by examiner

*Primary Examiner* — Terrance Kenerly
*Assistant Examiner* — Ahmed Elnakib
(74) *Attorney, Agent, or Firm* — Roberts Mlotkowski Safran & Cole, PC

(57) ABSTRACT

An electric power collection and distribution ring includes first to third bus rings configured to collect and distribute electric power from and to winding wires of a plurality of phases. The first to third bus rings include first to third annular conductor parts, respectively, and first to third feeding terminal parts, respectively, configured to feed electric power to the first to third annular conductor parts, respectively. The second feeding terminal part projects toward another side in an axial direction of the first to the third annular conductor parts without projecting toward the one side in the diameter direction than the first annular conductor part. The third feeding terminal part projects toward the another side in the axial direction of the first to the third annular conductor parts without projecting toward the one side in the diameter direction than the second annular conductor part.

10 Claims, 9 Drawing Sheets

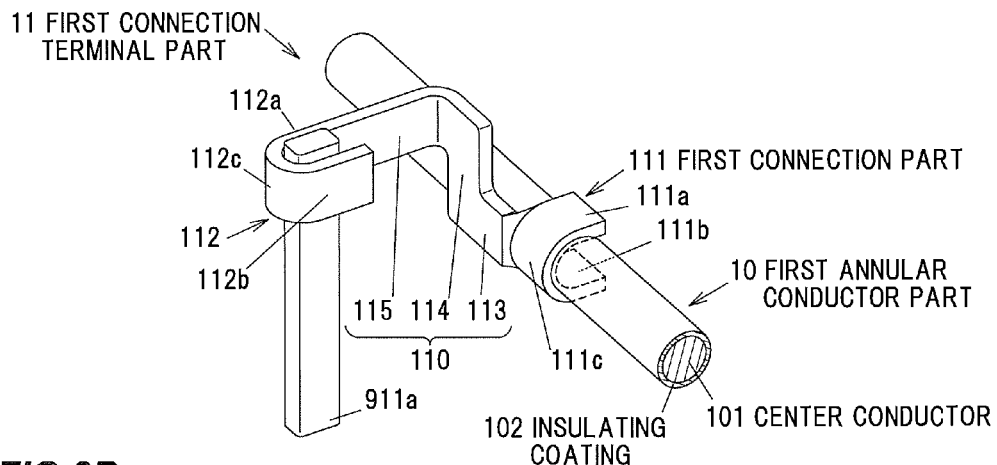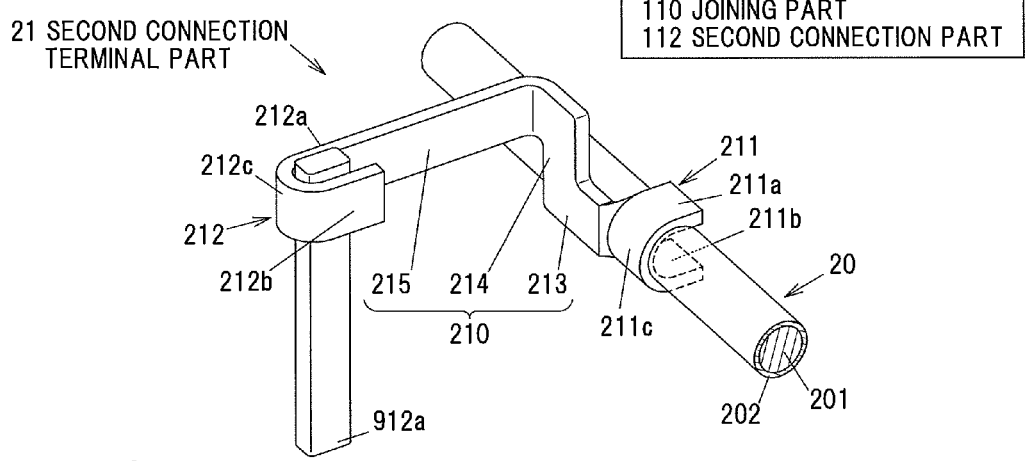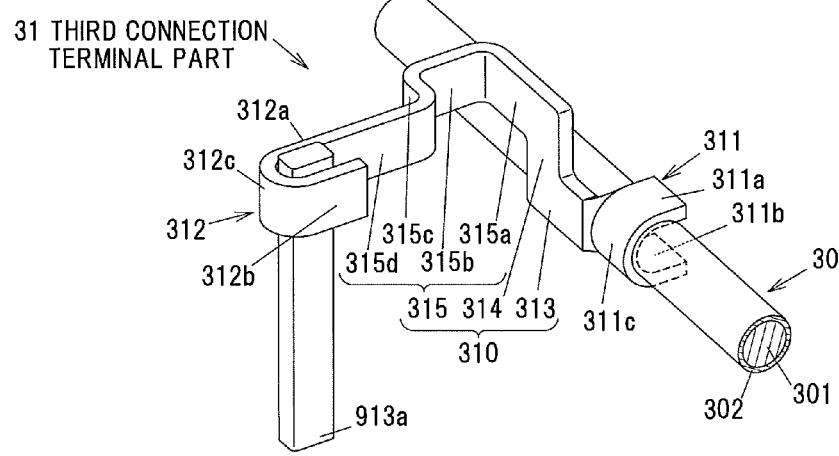

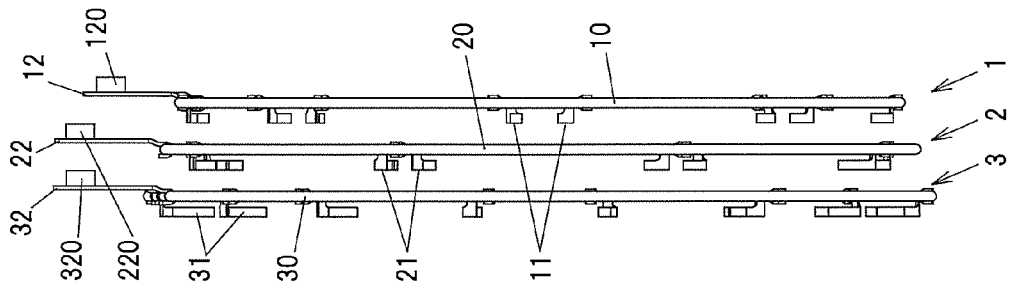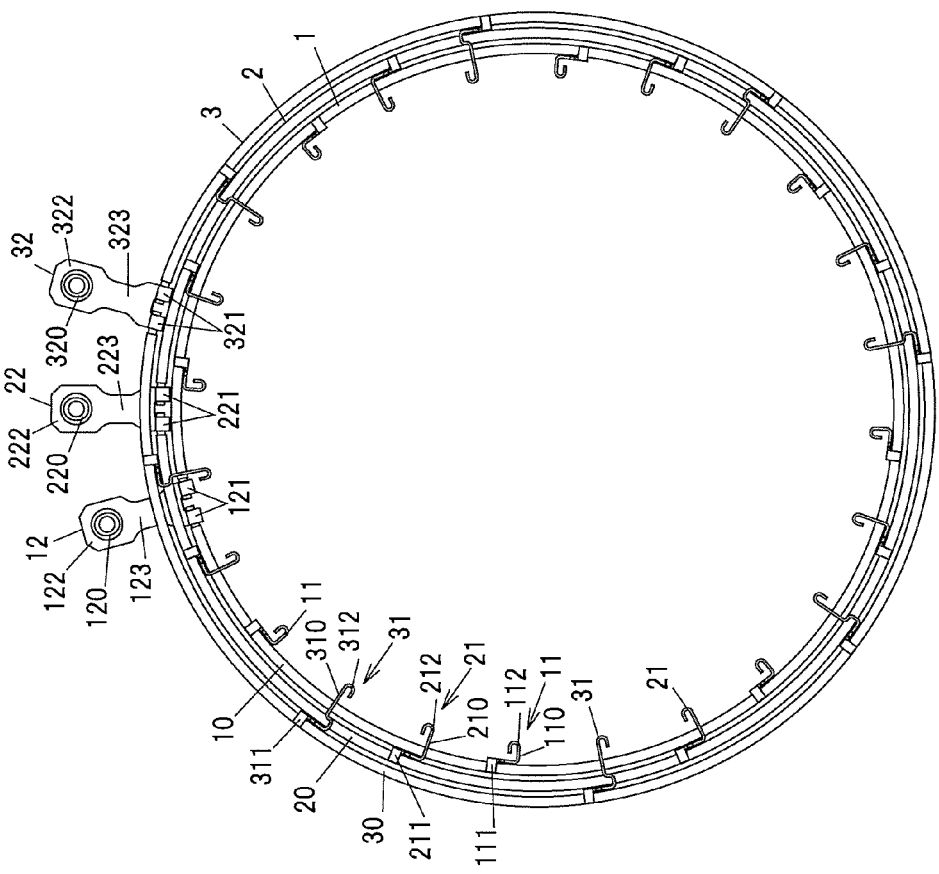

FIG.7A
FIG.7B
FIG.7C
FIG.7D
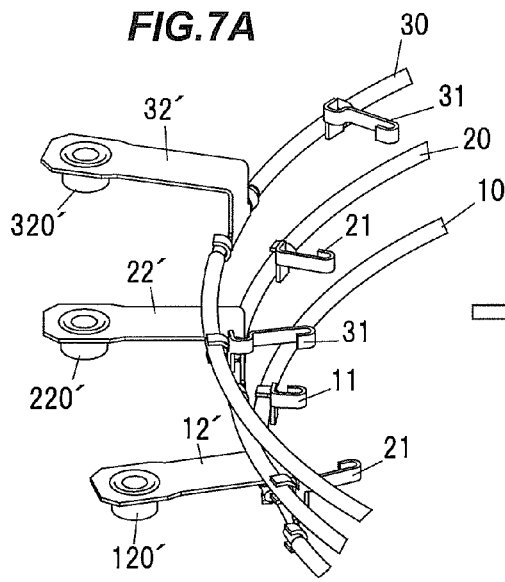
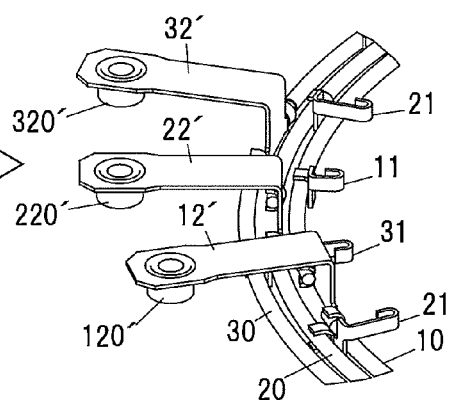
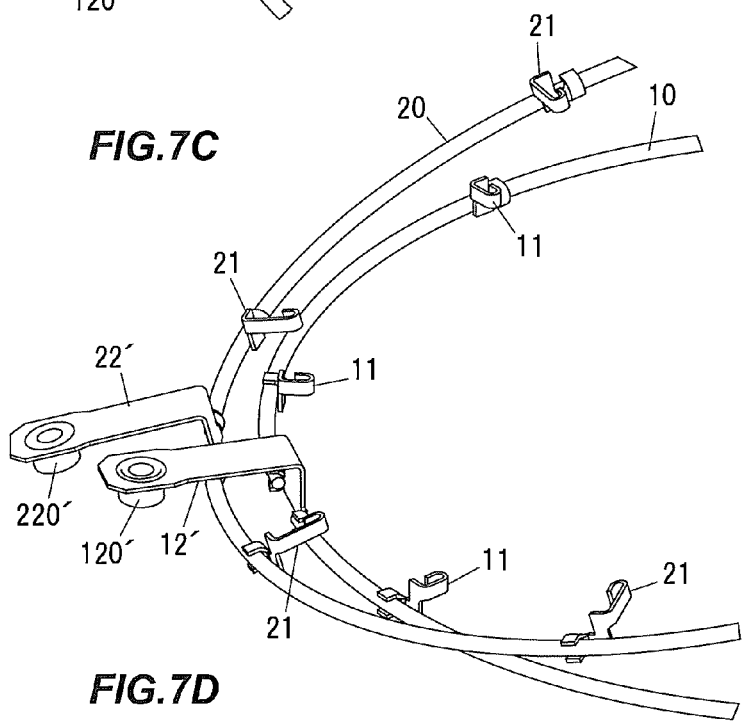
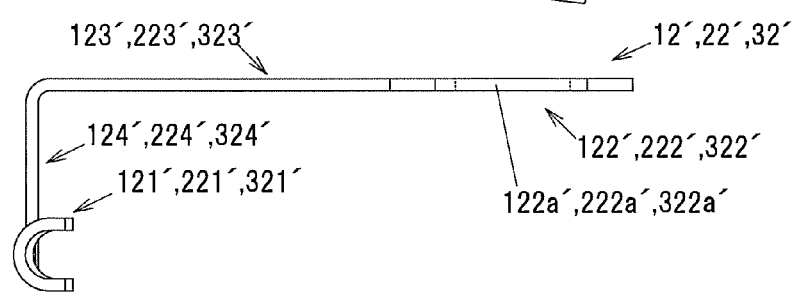

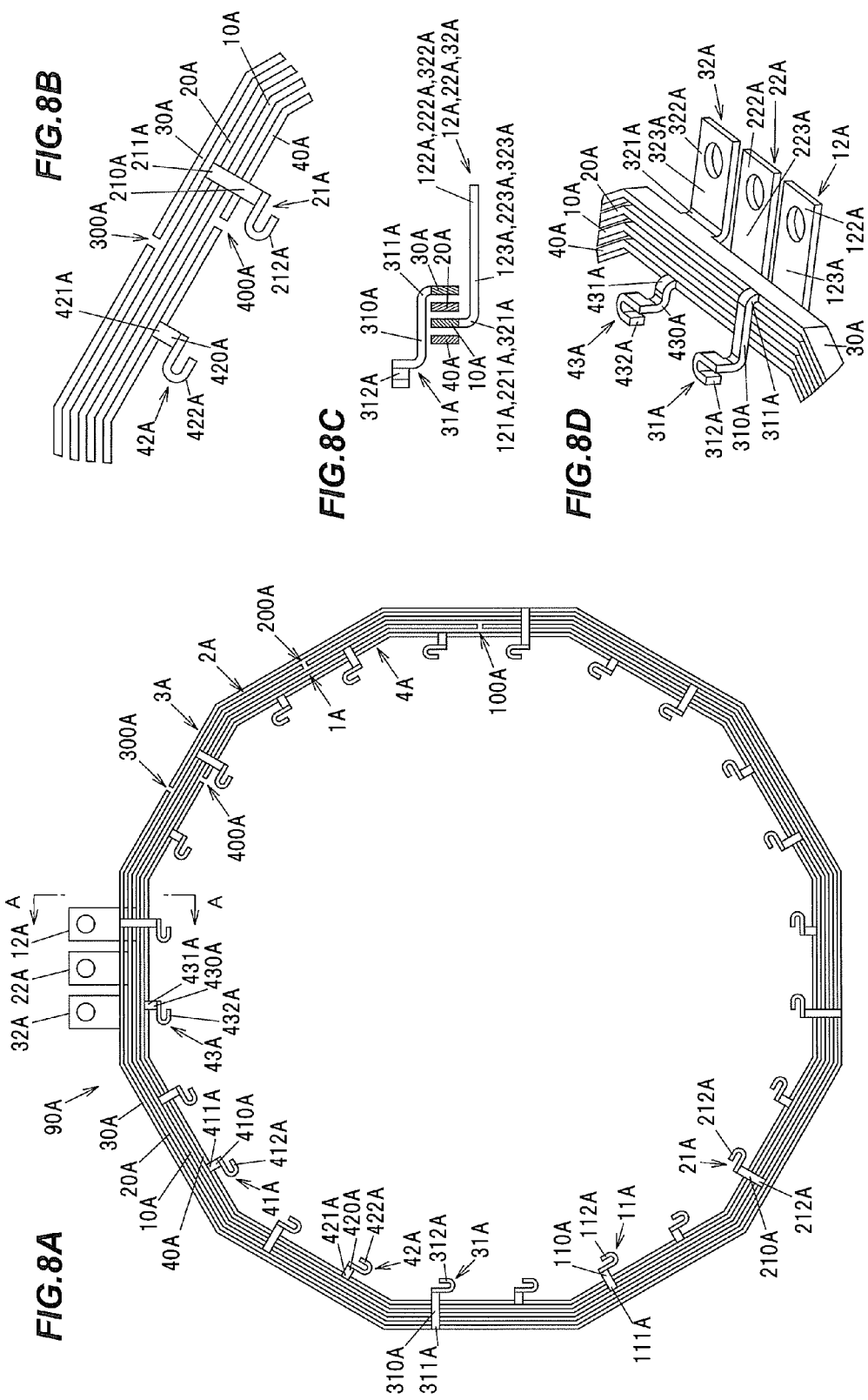

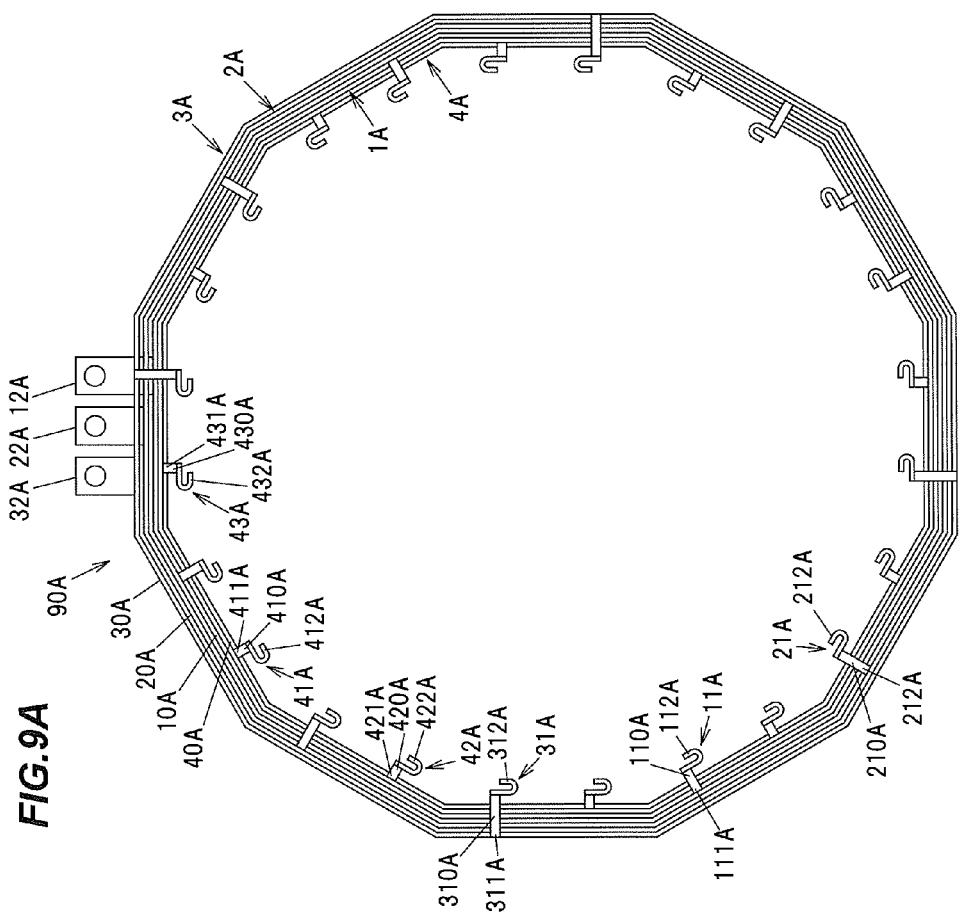
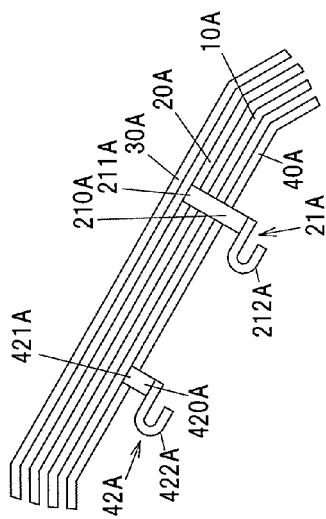

ELECTRIC POWER COLLECTION AND DISTRIBUTION RING AND ELECTRIC MOTOR

The present application is based on Japanese patent application No. 2012-247197 filed on Nov. 9, 2012, the entire contents of which are incorporated herein by reference.

BACKGROUND OF THE INVENTION

1. Field of the Invention

This invention relates to an electric power collection and distribution ring and an electric motor using the electric power collection and distribution ring.

2. Description of the Related Art

Conventionally, for example, an electric power collection and distribution ring is known, that collects and distributes motor current (carries out motor current collection and distribution) from and to winding wires of a stator of a three-phase AC motor (for example, refer to JP-A-2003-134759).

The electric power collection and distribution ring (centralized current distribution member) described in JP-A-2003-134759 is configured such that three annular bus bars are arranged in a housing room of an insulating holder so as to be stacked in a diameter direction. Each bus bar integrally includes an annular conductor part, a terminal part disposed in one place of a circumferential direction of the annular conductor part, and tubs disposed in a plurality of places of a circumferential direction of the annular conductor part. The bus bar is formed so as to be annularly curved in such a way that a part to be the annular conductor part is punched out from a conductive metal plate as a raw material together with parts to be the terminal part and the tub by a press device. Motor current is supplied to the terminal part, and winding wires of a motor are connected to the tubs. The terminal part projects exteriorly in a diameter direction of the annular conductor part and the tubs project interiorly in the diameter direction of the annular conductor part.

The electric power collection and distribution ring is assembled such that three annular bus bars having an annularly curved shape as a whole in which an annular terminal part of a plate member punched out from a raw material is bent are arranged in an insulating holder so as to be stacked in the diameter direction, and then the tubs are bent. The assembling procedure has been adopted in view of a problem that if the tubs have been preliminarily bent interiorly in the diameter direction, when the bus bars are arranged in the insulating holder, the annular conductor part interferes with the tubs so that the assembling becomes difficult.

SUMMARY OF THE INVENTION

However, the manufacturing method described in JP-A-2003-134759 requires two bending processes before and after the process of arranging three bus bars so as to be stacked in the diameter direction. Namely, it is necessary that the terminal part is bent exteriorly in the diameter direction before the stacking arrangement of three bus bars in the diameter direction, and after the stacking arrangement of three bus bars in the diameter direction, the tubs are bent interiorly in the diameter direction.

Further, if the terminal part is bent after the stacking arrangement of three bus bars in the diameter direction, the bending process is reduced to one time, but in the above-mentioned procedure, as shown in JP-A-2003-134759, a large stress acts on the insulating holder so that the insulating holder is likely to be deformed and broken. Namely, the terminal part is formed to have a width wider than that of the tub according to the amount of electricity, thus when the terminal part is bent, it is needed to apply a force larger than that applied when the tub is bent, so that a stress applied to the insulating holder comprised of a resin may exceed the strength thereof. Consequently, in the manufacturing method described in JP-A-2003-134759, it is needed that the annular terminal part is preliminarily bent and three annular bus bars are arranged in an insulating holder so as to be stacked, and then the tubs are bent, thus working process is complicated.

In addition, the problem that when a plurality of the annular conductor parts are arranged in parallel in the diameter direction, the assembling becomes difficult by the interference of the protrusions projecting interiorly and exteriorly from the annular conductor part in the diameter direction is similarly able to occur also in a case that a feeding terminal configured to feed electric power and a connection part configured to be connected to the winding wires are fixed to the annular conductor part comprised of the insulating electric wire by swaging or the like.

Accordingly, it is an object of the invention to provide an electric power collection and distribution ring that is capable of simplifying an assembling process at the time of manufacturing and an electric motor that includes the ring.

(1) According to one embodiment of the invention, an electric power collection and distribution ring comprises:

a first to a third bus rings configured to collect and distribute electric power from and to winding wires of a plurality of phases, the winding wires constituting a stator configured such that the winding wires are wound up around a plurality of teeth arranged annularly, wherein the first bus ring comprises a first annular conductor part, a plurality of first connection terminal parts configured to connect the first annular conductor part and the winding wire, and a first feeding terminal part configured to feed electric power to the first annular conductor part, wherein the second bus ring comprises a second annular conductor part, a plurality of second connection terminal parts configured to connect the second annular conductor part and the winding wire, and a second feeding terminal part configured to feed electric power to the second annular conductor part, wherein the third bus ring comprises a third annular conductor part, a plurality of third connection terminal parts configured to connect the third annular conductor part and the winding wire, and a third feeding terminal part configured to feed electric power to the third annular conductor part, wherein the first annular conductor part and the third annular conductor part are coaxially arranged in parallel in such a manner that the first annular conductor part is located at one side in a diameter direction of the second annular conductor part and the third annular conductor part is located at another side in a diameter direction of the second annular conductor part, wherein the first to the third connection terminal parts project at one side in an axial direction of the first to the third annular conductor parts, toward the one side in the diameter direction than the first annular conductor part, wherein the second feeding terminal part projects toward another side in an axial direction of the first to the third annular conductor parts without projecting toward the one side in the diameter direction than the first annular conductor part, and wherein the third feeding terminal part projects toward the another side in the axial direction of the first to the third annular conductor parts without projecting toward the one side in the diameter direction than the second annular conductor part.

In the above embodiment (1) of the invention, the following modifications and changes can be made.

(i) The first to the third feeding terminal parts project at the another side in the axial direction of the first to the third annular conductor parts, toward the another side in the diameter direction than the third annular conductor part.

(ii) The first to the third annular conductor parts is comprised of an insulated electric wire configured such that an insulation coating is formed on an outer periphery of a center conductor, wherein the first to the third connection terminal parts comprise a first connection part configured to be connected to the center conductor, a second connection part configured to be connected to the winding wire, a first extending and exiting part configured to extend and exit from the side of the first connection part to the one side in the axial direction, and a second extending and exiting part configured to extend and exit from an end part of the first extending and exiting part to the one side in the diameter direction, toward the side of the second connection part, and wherein the first connection part comprises a pair of protrusions configured to face each other across the center conductor and be contact with the center conductor.

(iii) The first to the third connection parts comprise an extending portion configured to extend along a circumferential direction of the first to the third annular conductor parts between the first connection part and the first extending and exiting part.

(iv) The first to the third annular conductor parts are comprised of an insulated electric wire configured such that an insulation coating is formed on an outer periphery of a center conductor, wherein the first and the second feeding terminal parts comprise a first connection part configured to be connected to the center conductor, a second connection part configured to project toward the another side in the diameter direction than the third annular conductor part so as to be connected to current feeders and a joining part configured to join the first connection part and the second connection part, wherein the joining part has a stepped shape in which a level difference part is formed, the level difference part configured such that the side of the second connection part is dislocated toward the another side in the axial direction so as to have a level difference larger than a thickness of the insulation coating, wherein the first feeding terminal part is configured such that the level difference part is formed closer to the one side of the diameter direction than the second and the third annular conductor parts, and wherein the second feeding terminal part is configured such that the level difference part is formed closer to the one side of the diameter direction than the third annular conductor part.

(2) According to another embodiment of the invention, an electric motor comprises:

the electric power collection and distribution ring according to the above embodiment (1);

a stator comprising a plurality of teeth and winding wire of a plurality of phases; and a rotor configured to rotate relative to the stator by magnetic field of the winding wire of a plurality of phases.

Points of the Invention

According to one embodiment of the invention, an electric power collection and distribution ring is constructed such that the first feeding terminal part and the second feeding terminal part include the level difference parts. Thereby the flat surface in the flatness part of the first feeding terminal part does not come into contact with the second and the third annular conductor parts, and the flat surface in the flatness part of the second feeding terminal part does not come into contact with the third annular conductor part. Thus, when the first to the third bus rings are overlapped with each other in the axial direction, the first to the third annular conductor parts do not interfere with the first to the third feeding terminal parts. Therefore, the assembling work of the electric power collection and distribution ring can be easily and shortly carried out.

BRIEF DESCRIPTION OF THE DRAWINGS

The preferred embodiments according to the invention will be explained below referring to the drawings, wherein:

FIG. 3A is a perspective view schematically showing a first connection terminal part used in the first embodiment of the invention;

FIG. 3B is a perspective view schematically showing a second connection terminal part used in the first embodiment of the invention;

FIG. 3C is a perspective view schematically showing a third connection terminal part used in the first embodiment of the invention;

FIG. 5A is a front view schematically showing a state of a first to a third bus rings used in the first embodiment of the invention, when viewed from an axial direction of a first to a third annular conductor parts;

FIG. 5B is a side view schematically showing a state of the first to the third bus rings used in the first embodiment of the invention, when viewed from a diameter direction of the first to the third annular conductor parts;

FIG. 7A is a perspective view schematically showing a state of the first to the third annular conductor parts before the first to the third annular conductor parts are overlapped with each other, in Comparative Example configured such that the first to the third feeding terminal parts are different from the first embodiment in a shape and a location;

FIG. 7B is a perspective view schematically showing a state of the first to the third annular conductor parts after the first to the third annular conductor parts are overlapped with each other, in Comparative Example;

FIG. 7C is a perspective view schematically showing a state of the first and the second annular conductor parts when the first and the second annular conductor parts are overlapped with each other, in Comparative Example;

FIG. 7D is a side view schematically showing shapes of the first to the third feeding terminal parts, in Comparative Example;

FIG. 8A is a front view schematically showing the electric power collection and distribution ring according to a second embodiment of the invention;

FIG. 8B is a partial enlarged view of FIG. 8A;

FIG. 8C is a cross-sectional view taken along the line A-A in FIG. 8A;

FIG. 8D is a partial enlarged view schematically showing the electric power collection and distribution ring according to the second embodiment of the invention;

FIG. 9A is a front view schematically showing a modification of the electric power collection and distribution ring according to the second embodiment of the invention shown in FIGS. 8A to 8D; and FIG. 9B is a partial enlarged view schematically showing the modification of the electric power collection and distribution ring according to the second embodiment of the invention.

DETAILED DESCRIPTION OF THE PREFERRED EMBODIMENTS

First Embodiment

Hereinafter, the first embodiment of the invention will be explained referring to FIGS. 1 to 6.

Figure 1:
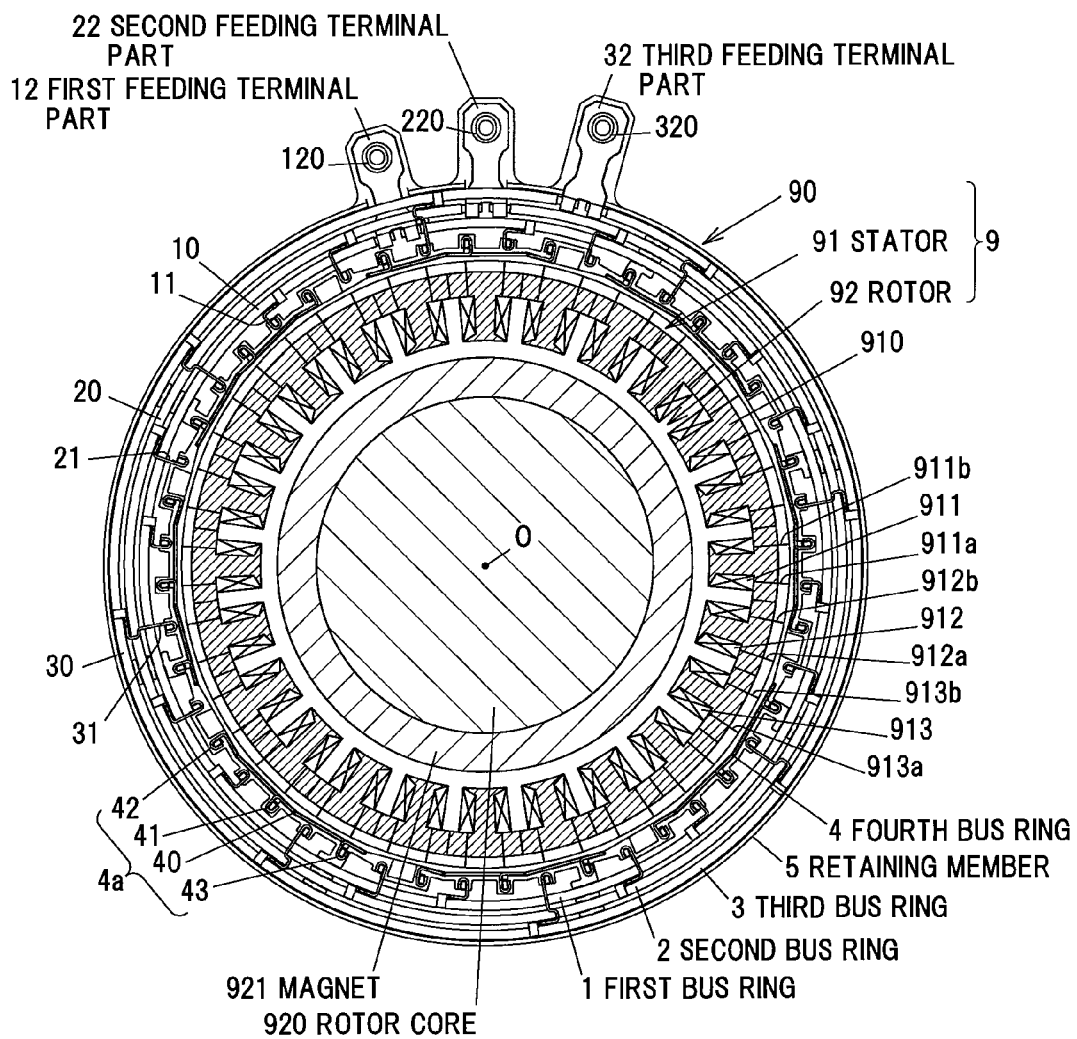
FIG. 1 is a cross-sectional view schematically showing an electric power collection and distribution ring according to a first embodiment of the invention, and an electric motor including the ring.

FIG. 1 is a cross-sectional view schematically showing an electric power collection and distribution ring according to a first embodiment of the invention, and an electric motor including the ring.

The electric motor 9 is a three-phase AC motor including a stator 91, a rotor 92, and an electric power collection and distribution ring 90 that collects and distributes motor current from and to the stator 91. Further, the electric motor 9 is configured such that the electric power collection and distribution ring 90 and the stator 91 are arranged along the same locus with a center focus on a rotation axis line O of the rotor 92, but in FIG. 1, the stator 91 is shown inside of the electric power collection and distribution ring 90 as a matter of practical convenience. The electric motor 9 is, for example, used for a driving source for travelling of vehicles.

The stator 91 is configured such that winding wires 911, 912, 913 of a plurality of phases to which an insulation coating such as enamel coating is applied are wound up around a plurality of teeth 910 that are comprised of a magnetic material and annularly arranged with a center focus on the rotation axis line O. U-phase winding wire 911, V-phase winding wire 912 or W-phase winding wire 913 is wound up around each of the teeth 910. U-phase, V-phase and W-phase electric currents are supplied to the winding wires 911, 912, 913 of a plurality of phases. Further, the rotation axis line O is a center of a plurality of teeth 910 arranged annularly and is corresponding to a rotation axis of the rotor 92.

The electric power collection and distribution ring 90 is configured to include a first to a fourth bus rings 1 to 4 that carry out electric power collection and distribution from and to the winding wires 911, 912, 913, and a retaining member 5 having an annular shape configured to retain the first to the fourth bus rings 1 to 4.

The first bus ring 1 is configured to include a first annular conductor part 10 comprised of an insulated wire having an annular shape with a center focus on a rotation axis line O, a plurality (8 in the embodiment) of first connection terminal parts 11 configured to connect the first annular conductor part 10 and the U-phase winding wire 911, and a first feeding terminal part 12 configured to feed electric power to the first annular conductor part 10. The first annular conductor part 10 is configured such that both end parts of the insulated wires are fixed to the first feeding terminal part 12 by swaging.

The second bus ring 2 is configured to include a second annular conductor part 20 comprised of an insulated wire having an annular shape with a center focus on a rotation axis line O, a plurality (8 in the embodiment) of second connection terminal parts 21 configured to connect the second annular conductor part 20 and the V-phase winding wire 912, and a second feeding terminal part 22 configured to feed electric power to the second annular conductor part 20. The second annular conductor part 20 is configured such that both end parts of the insulated wires are fixed to the second feeding terminal part 22 by swaging.

Similarly, the third bus ring 3 is configured to include a third annular conductor part 30 comprised of an insulated wire having an annular shape with a center focus on a rotation axis line O, a plurality (8 in the embodiment) of third connection terminal parts 31 configured to connect the third annular conductor part 30 and the W-phase winding wire 913, and a third feeding terminal part 32 configured to feed electric power to the third annular conductor part 30. The third annular conductor part 30 is configured such that both end parts of the insulated wires are fixed to the third feeding terminal part 32 by swaging.

The first annular conductor part 10 and the third annular conductor part 30 are coaxially arranged in parallel in such a manner that the first annular conductor part 10 is located at inner side in a diameter direction of the second annular conductor part 20 and the third annular conductor part 30 is located at outer side in a diameter direction of the second annular conductor part 20. Namely, the second annular conductor part 20 is formed to have a diameter larger than the first annular conductor part 10 so as to be arranged on the outer periphery of the first annular conductor part 10, and the third annular conductor part 30 is formed to have a diameter larger than the second annular conductor part 20 so as to be arranged on the outer periphery of the second annular conductor part 20.

The first to the third feeding terminal parts 12, 22, 32 project exteriorly in the diameter direction of the first to the third annular conductor parts 10, 20, 30 so as to be connected to an inverter via current feeders (not shown). Conductive rings 120, 220, 320 having a cylindrical shape that are used for increasing the thickness in the axial direction so as to be connected to terminals in the side of the current feeders are fixed to the first to the third feeding terminal parts 12, 22, 32, for example, by press fitting.

The first to the third bus rings 1 to 3 are configured to distribute motor current output from the inverter to each of the winding wires 911, 912, 913 of U-phase, V-phase and W-phase of the electric motor 9. The fourth bus ring 4 is a bus ring of a neutral phase of the stator 91, to which each end part of each of the winding wires 911, 912, 913 is connected.

The fourth bus ring 4 is comprised of a plurality (8 in the embodiment) of circular arc conductors 4a formed in a circular arc shape and is formed in an annular shape as a whole by that the circular arc conductors 4a are arranged along the circumferential direction of the retaining member 5. The circular arc conductors 4a are formed in such a way that a plate-like conductive raw material that is formed in a predetermined shape is subjected to plastic deformation. The fourth bus ring 4 is configured to integrally include a circular arc part 40 formed in a circular arc shape by being bent at a plurality of places, and a first to a third neutral phase connection terminal parts 41, 42, 43 that project exteriorly in the diameter direction from the circular arc part 40.

One end part 911a of the U-phase winding wire 911 is electrically connected to the first annular conductor part 10 via the first connection terminal part 11. Another end part 911b of the U-phase winding wire 911 is electrically connected to the first neutral phase connection terminal part 41 of the fourth bus ring 4. Similarly, one end parts 912a, 913a of the V-phase and the W-phase winding wires 912, 913 are electrically connected to the second and the third annular conductor parts 20, 30 via the second and the third connection terminal parts 21, 31, and another end parts 912b, 913b of the V-phase and the W-phase winding wires 912, 913 are electrically connected to the second and the third neutral phase connection terminal parts 42, 43 of the fourth bus ring 4.

The rotor 92 is according to include a rotor core 920 rotatably supported by a bearing (not shown) coaxially with the stator 91 and a magnet 921 having a plurality of magnetic poles that is fixed to the outer peripheral surface of the rotor core 920.

Motor currents having a sine-wave shape of which phases are shifted with each other by 120 degrees are supplied to each of the winding wires 911, 912, 913 of U-phase, V-phase and W-phase from the inverter (not shown), so as to form rotating magnetic field in the stator 91. The rotor 92 is rotated relative to the stator 91 by a rotation power which the magnet 921 receives by a suction force and a repelling force due to the rotating magnetic field.

Figure 2:
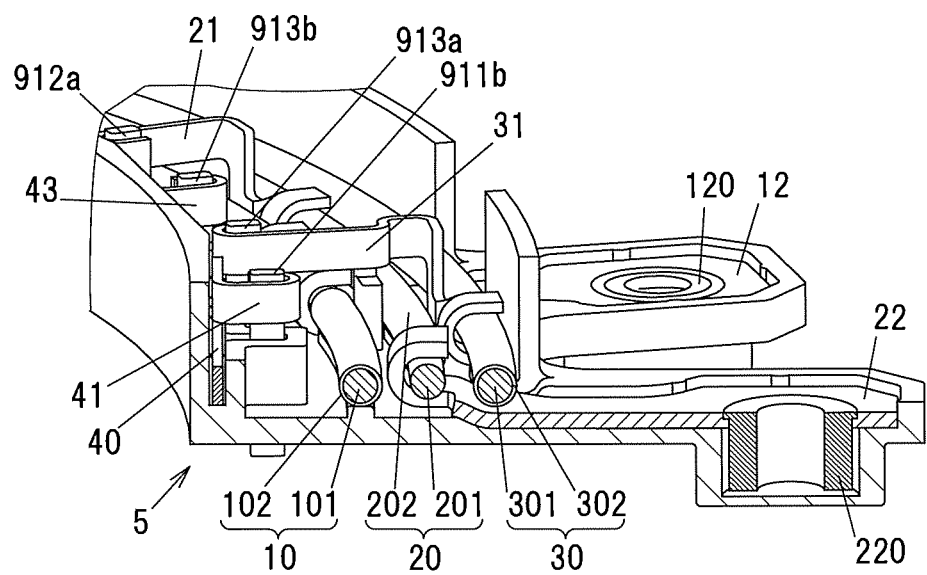
FIG. 2 is a perspective view (a partial cross-sectional view) schematically showing the electric power collection and distribution ring according to the first embodiment of the invention.

FIG. 2 is a perspective view (a partial cross-sectional view) schematically showing the electric power collection and distribution ring 90. The retaining member 5 is comprised of, for example, an injection-molded resin, and is formed in an annular shape so as to have a housing space configured to house the first to the fourth bus rings 1 to 4.

The first annular conductor part 10 is a round electric wire having a circular shape in cross-section and includes a center conductor 101 comprised of metal having a good electric conductivity such as copper, and an insulating coating 102 comprised of an insulating resin that is configured to coat the outer periphery of the center conductor 101. At the connection place of the first connection terminal part 11 and the first feeding terminal part 12, one ends of the first connection terminal part 11 and the first feeding terminal part 12 are fixed by swaging to the center conductor 101 exposed by that the insulating coating 102 is removed.

Similarly, the second annular conductor part 20 includes a center conductor 201 and an insulating coating 202, and at the connection place of the second connection terminal part 21 and the second feeding terminal part 22, one ends of the second connection terminal part 21 and the second feeding terminal part 22 are fixed by swaging to the center conductor 201 exposed by that the insulating coating 202 is removed. In addition, similarly, the third annular conductor part 30 includes a center conductor 301 and an insulating coating 302, and at the connection place of the third connection terminal part 31 and the third feeding terminal part 32, one ends of the third connection terminal part 31 and the third feeding terminal part 32 are fixed by swaging to the center conductor 301 exposed by that the insulating coating 302 is removed.

One end parts 911a, 912a, 913a of each of the winding wires 911, 912, 913 are inserted in the axial direction through insertion holes formed in the bottom part of the retaining member 5 so as to be connected to the first to the third connection terminal parts 11, 21, 31. In addition, another end parts 911b, 912b, 913b of each of the winding wires 911, 912, 913 are inserted in the axial direction through insertion holes formed in the bottom part of the retaining member 5 so as to be connected to the first to the third neutral phase connection terminal parts 41 to 43 of the fourth bus ring 4.

FIGS. 3A, 3B, 3C are perspective views schematically showing the first to the third connection terminal parts 11, 21, 31. In the embodiment, the first to the third connection terminal parts 11, 21, 31 are comprised of terminals that are formed separately from the first to the third annular conductor parts 10, 20, 30, and are formed in such a way that a plate-like conductive raw material that is formed in a predetermined shape is subjected to plastic deformation based on bending.

The first connection terminal part 11 is configured to include a first connection part 111 connected to the center conductor 101 of the first annular conductor part 10, a second connection part 112 connected to the one end part 911a of the winding wire 911, and a joining part 110 configured to join the first connection part 111 and the second connection part 112. The second connection part 112 is located more interiorly in the diameter direction of the first annular conductor part 10 than the first connection part 111.

The joining part 110 is configured to include an extending portion 113 extending along a circumferential direction of the first annular conductor part 10 from the first connection part 111, a first extending and exiting part 114 extending in the axial direction of the first annular conductor part 10 from the end part of the extending portion 113, and a second extending and exiting part 115 extending interiorly in the diameter direction toward the side of the second connection part 112 from the end part of the first extending and exiting part 114. The extending portion 113 is arranged between the first annular conductor part 10 and the circular arc part 40 in the circular arc conductors 4a of the fourth bus ring 4. The extending portion 113 and the first extending and exiting part 114 are arranged such that the thickness direction thereof is along the diameter direction of the first annular conductor part 10.

The first connection part 111 is configured to include a pair of protrusions 111a, 111b facing each other across the center conductor 101 and a curved part 111c having a semicircle shape in cross-section that intervenes between one protrusion 111a and another protrusion 111b. The first connection part 111 is swaged with the center conductor 101, thereby it is configured such that the one protrusion 111a and the another protrusion 111b are come into contact with the center conductor 101 so as to form the curved part 111c. The first connection part 111 exhibits a C-shape opening exteriorly in the diameter direction of the first annular conductor part 10, if viewed from the circumferential direction of the first annular conductor part 10.

The second connection part 112 is configured to include a pair of protrusions 112a, 112b facing each other across the one end part 911a of the winding wire 911 and a curved part 112c having a semicircle shape in cross-section that intervenes between one protrusion 112a and another protrusion 112b. The second connection part 112 is connected to the one end part 911a of the winding wire 911, for example, by fusing (thermal swaging). The one protrusion 112a is formed successively to the second extending and exiting part 115 along the extending direction of the second extending and exiting part 115. In the embodiment, the winding wire 911 is comprised of a rectangular copper wire formed to have a rectangular shape in cross-section, a pair of the protrusions 112*a*, 112*b* face with each other along the long side in the cross-section. The second connection part 112 exhibits a U-shape opening exteriorly in the diameter direction of the first annular conductor part 10, if viewed from the extending direction of the one end part 911*a* of the winding wire 911.

The second connection terminal part 21 is formed similarly to the first connection terminal part 11 except that the length of the second extending and exiting part 215 in the joining part 210 is longer than that of the second extending and exiting part 115 of the first connection terminal part 11. Namely, the second connection terminal part 21 is configured to include a first connection part 211 connected to the center conductor 201 of the second annular conductor part 20, a second connection part 212 connected to the one end part 912*a* of the winding wire 912, and a joining part 210 configured to join the first connection part 211 and the second connection part 212. The joining part 210 is configured to include an extending portion 213 extending along a circumferential direction of the second annular conductor part 20 from the second connection part 211, a first extending and exiting part 214 extending in the axial direction of the second annular conductor part 20 from the end part of the extending portion 213, and a second extending and exiting part 215 extending interiorly in the diameter direction toward the side of the second connection part 212 from the end part of the first extending and exiting part 214. The extending portion 213 is arranged between the second annular conductor part 20 and the first annular conductor part 10. The extending portion 213 and the first extending and exiting part 214 are arranged such that the thickness direction thereof is along the diameter direction of the second annular conductor part 20.

The first connection part 211 is configured to include a pair of protrusions 211*a*, 211*b* and a curved part 211*c*, exhibit a C-shape, and be connected to the center conductor 201 of the second annular conductor part 20 by swaging. The second connection part 212 is configured to include a pair of protrusions 212*a*, 212*b* and a curved part 212*c*, exhibit a U-shape, and be connected to the one end part 912*a* of the winding wire 912 by fusing.

The third connection terminal part 31 is configured to, similarly to the first and the second connection terminal parts 11, 21, include a first connection part 311 connected to the center conductor 301 of the second annular conductor part 30, a second connection part 312 connected to the one end part 913*a* of the winding wire 913, and a joining part 310 configured to join the first connection part 311 and the second connection part 312, but the shape of the joining part 310 is different from those of the joining parts 110, 210 of the first and the second connection terminal parts 11, 21.

The joining part 310 of the third connection terminal part 31 is configured to include an extending portion 313 extending along a circumferential direction of the third annular conductor part 30 from the first connection part 311, a first extending and exiting part 314 extending in the axial direction of the third annular conductor part 30 from the end part of the extending portion 313, and a second extending and exiting part 315 extending interiorly in the diameter direction toward the side of the second connection part 312 from the end part of the first extending and exiting part 314. The extending portion 313 is arranged between the third annular conductor part 30 and the second annular conductor part 20. The extending portion 313 and the first extending and exiting part 314 are arranged such that the thickness direction thereof is along the diameter direction of the third annular conductor part 30.

The second extending and exiting part 315 is configured to include a first joining part 315*a* configured to be continuously joined to the end part of first extending and exiting part 314 and to extend in the circumferential direction of the third annular conductor part 30, a second joining part 315*b* configured to extend interiorly in the diameter direction of the third annular conductor part 30 from the end part of the first joining part 315*a*, a third joining part 315*c* configured to face the first joining part 315*a* and extend in the circumferential direction of the third annular conductor part 30 from the end part of the second joining part 315*b*, and a fourth joining part 315*d* configured to extend interiorly in the diameter direction of the third annular conductor part 30 from the end part of the third joining part 315*c*.

The first connection part 311 is configured to include a pair of protrusions 311*a*, 311*b* and a curved part 311*c*, exhibit a C-shape, and be connected to the center conductor 301 of the third annular conductor part 30 by swaging. The second connection part 312 is configured to include a pair of protrusions 312*a*, 312*b* and a curved part 312*c*, exhibit a U-shape, and be connected to the one end part 913*a* of the winding wire 913 by fusing.

Figure 4A:
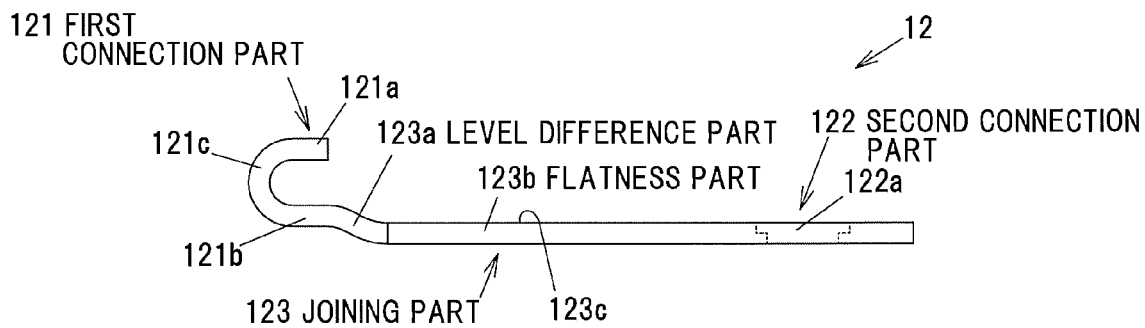
FIG. 4A is a side view schematically showing a first feeding terminal part used in the first embodiment of the invention.
Figure 4B:
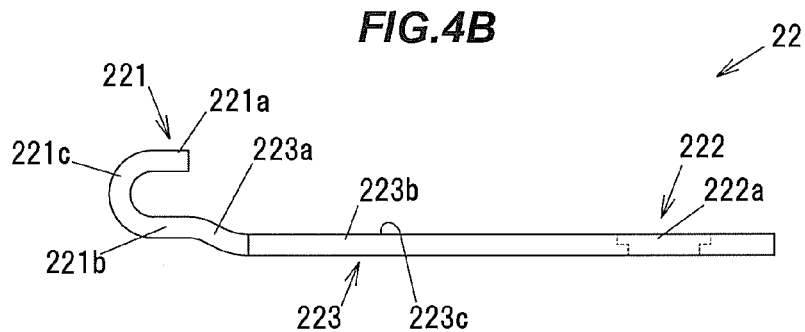
FIG. 4B is a side view schematically showing a second feeding terminal part used in the first embodiment of the invention.
Figure 4C:
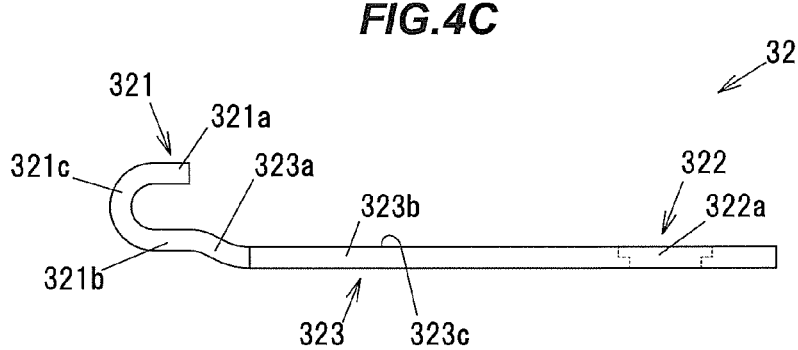
FIG. 4C is a side view schematically showing a third feeding terminal part used in the first embodiment of the invention.

FIGS. 4A, 4B, 4C are side views schematically showing the first to the third feeding terminal parts 12, 22, 32 respectively. In the embodiment, the first to the third feeding terminal parts 12, 22, 32 are formed separately from the first to the third annular conductor parts 10, 20, 30, and are formed in such a way that a plate-like conductive raw material that is formed in a predetermined shape is subjected to plastic deformation based on bending.

As shown in FIG. 4A, the first feeding terminal part 12 is configured to include a first connection part 121 connected to the center conductor 101 of the first annular conductor part 10, a second connection part 122 connected to a current feeder (not shown), and a joining part 123 configured to join the first connection part 121 and the second connection part 122.

The joining part 123 is configured to include a level difference part 123*a* and a flatness part 123*b*, and have a stepped shape in which the level difference part 123*a* is formed in the side of the first connection part 121 and the flatness part 123*b* is formed in the side of the second connection part 122. The level difference part 123*a* is inclined relative to the diameter of the first annular conductor part 10. The flatness part 123*b* has a flat plate-like shape in which a flat surface 123*c* located at the one side of the axial direction and facing the second and the third annular conductor parts 20, 30 is formed in parallel to the diameter direction of the first annular conductor part 10, namely, the arrangement direction of the first to the third annular conductor parts 10, 20, 30.

The first connection part 121 is configured to include a pair of protrusions 121*a*, 121*b* facing each other across the center conductor 101 and a curved part 121*c* having a semicircle shape in cross-section that intervenes between one protrusion 121*a* and another protrusion 121*b*. The first connection part 121 is swaged with the center conductor 101, thereby it is configured such that the one protrusion 121*a* and the another protrusion 121*b* are come into contact with the center conductor 101 so as to form the curved part 121*c*. The first connection part 121 exhibits a C-shape opening exteriorly in the diameter direction of the first annular conductor part 10, if viewed from the circumferential direction of the first annular conductor part 10. A through hole 122*a* into which the conductive ring 120 is pressed is formed in the second connection part 122.

The level difference part 123a is configured such that the side of the second connection part 122 (the side of the flatness part 123b) is dislocated toward the axial direction of the first annular conductor part 10 (the direction separating the flatness part 123b away from the second and the third annular conductor parts 20, 30). In addition, the level difference part 123a is formed to be located more interiorly in the diameter direction than the second and the third annular conductor parts 20, 30. The level difference part 123a has the above-mentioned configuration, thereby the flat surface 123c of the flatness part 123b is configured not to come into contact with the outer peripheries of the second and the third annular conductor parts 20, 30.

The second and the third feeding terminal parts 22, 33 are formed in the same shape as that of the first feeding terminal part 12. Namely, the second and the third feeding terminal parts 22, 32 are configured to include first connection parts 221, 321 connected to the center conductors 201, 301 of the second and the third annular conductor parts 20, 30, second connection parts 222, 322 connected to a current feeder (not shown), and joining parts 223, 323 configured to join the first connection parts 221, 321 and the second connection parts 222, 322.

The first connection parts 221, 321 are configured to include a pair of protrusions 221a, 221b facing each other across the center conductors 201, 301 and curved parts 221c, 321c. Through holes 222a, 322a into which the conductive rings 220, 320 are pressed is formed in the second connection parts 222, 322.

The joining parts 223, 323 are configured to include level difference parts 223a, 323a and flatness parts 223b, 323b and have a stepped shape in which the level difference parts 223a, 323a are formed in the side of the first connection parts 221, 321 and the flatness parts 223b, 323b are formed in the side of the second connection parts 222, 322. The level difference parts 223a, 323a are inclined relative to the diameter of the second and the third annular conductor parts 20, 30 so as to have a level difference larger than thicknesses of the insulating coating 202, 302 of the second and the third annular conductor parts 20, 30. The flatness parts 223b, 323b have a flat plate-like shape in which flat surfaces 223c, 323c located at the one side of the axial direction are formed in parallel to the diameter direction of the second and the third annular conductor parts 20, 30.

The flat surface 223c in the joining part 223 of the second feeding terminal part 22 faces the third annular conductor part 30. The level difference part 223a of the second feeding terminal part 22 is formed more interiorly in the diameter direction than the third annular conductor part 30. Due to the above-mentioned configuration, the flat surface 223c is configured not to come into contact with the outer peripheral surface of the third annular conductor part 30.

FIG. 5A is a front view schematically showing a state of the first to the third bus rings 1 to 3, when viewed from an axial direction of the first to the third annular conductor parts 10, 20, 30 and FIG. 5B is a side view schematically showing a state of the first to the third bus rings 1 to 3, when viewed from a diameter direction of the first to the third annular conductor parts 10, 20, 30. As a matter of explanatory convenience, FIG. 5B shows a state of separating the first to the third bus rings 1 to 3 from each other in parallel in the axial direction. In addition, hereinafter, the left side in FIG. 5B (the front side in FIG. 5A) and the right side in FIG. 5B (the back side in FIG. 5A) will be respectively explained as the one side in the axial direction and the another side in the axial direction.

Figure 6A:
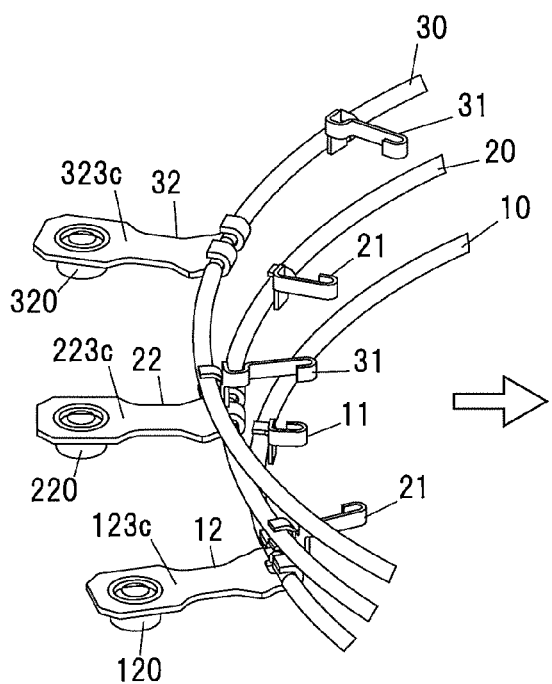
FIG. 6A is a perspective view schematically showing a state of the first to the third bus rings used in the first embodiment of the invention, before the rings are overlapped with each other so as to be arranged in parallel in the diameter direction.
Figure 6B:
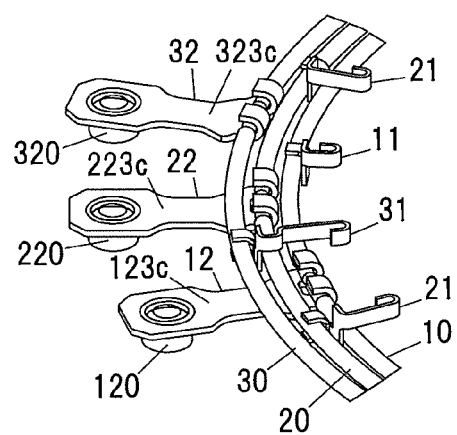
FIG. 6B is a perspective view schematically showing a state of the first to the third bus rings used in the first embodiment of the invention, after the rings are overlapped with each other so as to be arranged in parallel in the diameter direction.

FIGS. 6A, 6B are perspective views schematically showing a state of the first to the third bus rings 1 to 3, before and after the rings 1 to 3 are overlapped with each other so as to be arranged in parallel in the diameter direction.

The first to the third connection terminal parts 11, 21, 31 is configured such that the second connection parts 112, 212, 312 project more interiorly in the diameter direction than the first annular conductor part 10 at the one side in the axial direction of the first to the third annular conductor parts 10, 20, 30. The joining parts 110, 210, 310 and the second connection parts 112, 212, 312 of the first to the third connection terminal parts 11, 21, 31 are located at the one side in the axial direction of the first to the third annular conductor parts 10, 20, 30.

The second feeding terminal part 22 projects toward the another side in the axial direction the first to the third annular conductor parts 10, 20, 30 without projecting more interiorly in the diameter direction than the first annular conductor part 10. The third feeding terminal part 32 projects toward the another side in the axial direction the first to the third annular conductor parts 10, 20, 30 without projecting more interiorly in the diameter direction than the second annular conductor part 20. In addition, the first to the third feeding terminal parts 12, 22, 32 are configured such that the second connection parts 122, 222, 322 (refer to FIGS. 4A to 4C) project more exteriorly in the diameter direction than the third annular conductor part 30 at the another side in the axial direction of the first to the third annular conductor parts 10, 20, 30. The first to the third feeding terminal parts 12, 22, 32 are configured such that the joining parts 123, 223, 323 and the second connection parts 122, 222, 322 are located at the another side in the axial direction of the first to the third annular conductor parts 10, 20, 30.

As shown in FIGS. 6A, 6B, the overlapping of the first to the third bus rings 1 to 3 is carried out by arranging the second bus ring 2 at the one side in the axial direction of the first bus ring 1 and arranging the third bus ring 3 at the one side in the axial direction of the second bus ring 2 so as to relatively displace the first to the third bus rings 1 to 3 in the axial direction. Due to this, the second and the third annular conductor parts 20, 30 face the flat surface 123c of the first feeding terminal part 12, and the third annular conductor part 30 faces the flat surface 223c of the second feeding terminal part 22.

In addition, as the embodiment, in case that the first to the third bus rings 1 to 3 are housed in the housing space of the retaining member 5 so as to be retained, the first to the third bus rings 1 to 3 can be housed in the housing space in a state that the first to the third bus rings 1 to 3 are preliminarily overlapped with each other, and the first to the third bus rings 1 to 3 can be also sequentially housed in the housing space of the retaining member 5.

Comparative Example

FIG. 7A shows a state before the first to the third annular conductor parts 10, 20, are overlapped with each other, in Comparative Example configured such that the first to the third feeding terminal parts 12', 22', 32' are different from the first embodiment in a shape and a location, FIG. 7B shows a state of after the first to the third annular conductor parts 10, 20, 30 are overlapped with each other, FIG. 7C shows a state when the first and the second annular conductor parts 10, 20, 30 are overlapped with each other and FIG. 7D shows shapes of the first to the third feeding terminal parts 12', 22', 32'. In FIG. 7, as to the same elements in compositions and functions as those explained referring to FIGS. 1 to 6, the same references will be used, and detail explanation will be omitted.

As shown in FIG. 7D, the first to the third feeding terminal parts 12', 22', 32' is configured to integrally include the first to the third connection parts 121', 221', 321' connected to the center conductor of the first to the third annular conductor parts 10, 20, 30, the second connection parts 122', 222', 322' connected to the current feeders (not shown), the first extending and existing part 123', 223', 323' extending in the diameter direction of the first to the third annular conductor parts 10, 20, 30 successively to the second connection parts 123', 223', 323', and the second extending and existing part 124', 224', 324' connecting between the first extending and existing part 123', 223', 323' and the first to the third connection parts 121', 221', 321' in the axial direction of the first to the third annular conductor parts 10, 20, 30.

As shown in FIG. 7B, the first to the third feeding terminal parts 12', 22', 32' project toward the same side as the first to the third connection terminal parts 11, 21, 31 (the one side in the axial direction) relative to the first to the third annular conductor parts 10, 20, 30. Consequently, if the first to the third annular conductor parts 10, 20, 30 is relatively displaced in the axial direction from the state shown in FIG. 7A, the second and the third annular conductor parts 20, 30 interfere with the first feeding terminal part 12', and simultaneously the third annular conductor part 30 interferes with the second feeding terminal part 22'. Accordingly, for example, in shown in FIG. 7C, it is necessary that the second feeding terminal part 22' is passed through from the inner side of the second annular conductor part 20, the second feeding terminal part 22' is led to the one side in the axial direction, after that, the first and the second annular conductor parts 10, 20 are aligned in a concentric shape and arranged in parallel with each other in the diameter direction. It is the same in a case that the third annular conductor part 30 to which the third feeding terminal part 32' is connected is assembled with the first and the second annular conductor parts 10, 20. Consequently, the assembling work becomes troublesome and the working time is increased.

Functions and Effects of the First Embodiment

According to the first embodiment explained above, the following functions and effects are exerted.

(1) In case that the first to the third bus rings 1 to 3 are overlapped with each other in the axial direction, the first to the third annular conductor parts 10, 20, 30 do not interfere with the first to the third feeding terminal parts 12, 22, 32. Therefore, for example, in comparison with Comparative Example shown in FIG. 7, the assembling work of the electric power collection and distribution ring 90 can be easily and shortly carried out.

(2) The first to the third feeding terminal parts 12, 22, 32 project more exteriorly in the diameter direction than the third annular conductor part 30 arranged at the outmost periphery of the first to the third annular conductor parts 10, 20, 30, thus the electric power collection and distribution ring 90 can be reduced in thickness in the axial direction, for example, in comparison with a case that the whole of the first to the third feeding terminal parts 12, 22, 32 project toward the another side in the axial direction along the axial direction (perpendicular to the circumferential direction of the first to the third annular conductor parts 10, 20, 30).

(3) The first to the third connection terminal parts 11, 21, 31 include the first connection parts 111, 211, 311 having a C-shape in cross-section and the first extending and exiting parts 114, 214, 314 extending in the axial direction of the first to the third annular conductor parts 10, 20, 30, thus the first to the third connection terminal parts 11, 21, 31 and the center conductors 101, 201, 301 of the annular conductor parts 10, 20, 30 can be rigidly connected to each other, and simultaneously the second extending and exiting part 315 and the second connection parts 112, 212, 312 extending interiorly in the diameter direction from the end part of the one side in the axial direction of the first extending and exiting parts 114, 214, 314 can be arranged at the one side in the axial direction of the first to the third annular conductor parts 10, 20, 30.

(4) The first to the third connection terminal parts 11, 21, 31 include the extending portions 113, 213, 313 extending from the first connection parts 111, 211, 311 along the circumferential direction of the first to the third annular conductor parts 10, 20, 30, thus an interference between a swaging tool and the first extending and exiting part 114 at the time of swaging the first connection parts 111, 211, 311 is avoided, so as to carry out the swaging work easily and surely, and simultaneously deformation of the joining parts 110, 210, 310 in association with the swaging of the first connection parts 111, 211, 311 is absorbed in the extending portions 113, 213, 313, so as to inhibit distortion and inclination of the first extending and exiting parts 114, 214, 314. In addition, as the invention, in case that the first to the fourth bus rings 1 to 4 are arranged in parallel to each other in the diameter direction, the thickness direction of the extending portions 113, 213, 313 is along the diameter direction of the first to the third annular conductor parts 10, 20, 30, thus intervals in the diameter direction of the first to the third annular conductor parts 10, 20, 30 can be reduced, and then the electric power collection and distribution ring 90 can be reduced in the width in the diameter direction.

(5) The first feeding terminal part 12 and the second feeding terminal part 22 include the level difference parts 123a, 223a, thereby the flat surface 123c in the flatness part 123b of the first feeding terminal part 12 does not come into contact with the second and the third annular conductor parts 20, 30, in addition, the flat surface 223c in the flatness part 223b of the second feeding terminal part 22 does not come into contact with the third annular conductor part 30. Due to this, for example, abrasion of the insulating coatings 202, 302 of the second and the third annular conductor parts 20, 30 can be prevented, the abrasion being caused by sliding between the flat surfaces 123c, 223c and the insulating coatings 202, 302 due to vibration of vehicles.

Second Embodiment

Next, the second embodiment of the invention will be explained referring to FIGS. 8A to 8D. In the first embodiment, a configuration has been explained, that the first to the third annular conductor parts 10, 20, 30 of the electric power collection and distribution ring 90 are comprised of insulating electric wires, and the first to the third connection terminal parts 11, 21, 31 and the first to the third feeding terminal parts 12, 22, 32 that are formed separately from each other are connected to the center conductors 101, 201, 301, but the electric power collection and distribution ring 90A according to the embodiment is different from the first embodiment mainly in having a configuration that the first to the third bus rings 1A to 3A are respectively comprised of an electric member that is formed integrally.

FIG. 8A is a front view schematically showing the electric power collection and distribution ring 90A according to the second embodiment, FIG. 8B is a partial enlarged view of FIG. 8A, FIG. 8C is a cross-sectional view taken along the line A-A in FIG. 8A, and FIG. 8D is a partial enlarged view schematically showing the electric power collection and distribution ring 90A. In addition, hereinafter, the front side in FIG. 8A (the upper side in FIG. 8A) and the back side in FIG. 8A (the lower side in FIG. 8A) will be respectively explained as the one side in the axial direction and the another side in the axial direction.

The electric power collection and distribution ring 90A is configured to include a first to a third bus rings 1A, 2A, 3A that supply electric currents of U-phase, V-phase and W-phase to the winding wires 911, 912, 913 (refer to FIG. 1) of the stator 91, and a bus ring 4A through which a neutral phase electric current flows.

The first bus ring 1A is configured to integrally include a first annular conductor part 10A, a plurality (8) of first connection terminal parts 11A and one first feeding terminal part 12A. The first annular conductor part 10A has a polygonal shape configured such that a copper plate having a band-like shape are bent at a plurality (12) of places in the circumferential direction, and is formed so as to have an annular shape as a whole. Parts corresponding to both end parts in the longitudinal direction of the copper plate of a band-like shape face with each other across a void 100A in the circumferential direction. The first connection terminal part 11A is configured to include a first extending and exiting part 111A that projects toward the one side in the axial direction from the end part in the width direction of the first annular conductor part 10A, a second extending and exiting part 110A that extends interiorly in the diameter direction from the end part of the one side in the axial direction of the first extending and exiting part 111A, and a connection part 112A that is formed at the end part located interiorly in the diameter direction of the second extending and exiting part 110A, and is connected to one end part 911a (refer to FIG. 1) of the winding wire 911.

The first feeding terminal part 12A is configured to include a first extending and exiting part 121A that projects toward the another side in the axial direction from the end part in the width direction of the first annular conductor part 10A, a second extending and exiting part 123A that extends exteriorly in the diameter direction from the end part of the one side in the axial direction of the first extending and exiting part 121A, and a connection part 122A that is formed at the end part located exteriorly in the diameter direction of the second extending and exiting part 123A, and is connected to current feeders (not shown).

The second bus ring 2A is configured to integrally include a second annular conductor part 20A, a plurality (8) of second connection terminal parts 21A and one second feeding terminal part 22A. The second annular conductor part 20A has a polygonal shape configured such that a copper plate having a band-like shape are bent at a plurality (12) of places in the circumferential direction, and is formed so as to have an annular shape as a whole. Parts corresponding to both end parts in the longitudinal direction of the copper plate of a band-like shape face with each other across a void 200A in the circumferential direction. The second connection terminal part 21A is configured to include a first extending and exiting part 211A that projects toward the one side in the axial direction from the end part in the width direction of the second annular conductor part 20A, a second extending and exiting part 210A that extends interiorly in the diameter direction from the end part of the one side in the axial direction of the first extending and exiting part 211A, and a connection part 212A that is formed at the end part located interiorly in the diameter direction of the second extending and exiting part 210A, and is connected to one end part 912a (refer to FIG. 1) of the winding wire 912.

The second feeding terminal part 22A is configured to include a first extending and exiting part 221A that projects toward the another side in the axial direction from the end part in the width direction of the second annular conductor part 20A, a second extending and exiting part 223A that extends exteriorly in the diameter direction from the end part of the one side in the axial direction of the first extending and exiting part 221A, and a connection part 222A that is formed at the end part located exteriorly in the diameter direction of the second extending and exiting part 223A, and is connected to current feeders (not shown).

The third bus ring 3A is configured to integrally include a third annular conductor part 30A, a plurality (8) of third connection terminal parts 31A and one third feeding terminal part 32A. The third annular conductor part 30A has a polygonal shape configured such that a copper plate having a band-like shape are bent at a plurality (12) of places in the circumferential direction, and is formed so as to have an annular shape as a whole. Parts corresponding to both end parts in the longitudinal direction of the copper plate of a band-like shape face with each other across a void 300A in the circumferential direction. The third connection terminal part 31A is configured to include a first extending and exiting part 311A that projects toward the one side in the axial direction from the end part in the width direction of the third annular conductor part 30A, a second extending and exiting part 310A that extends interiorly in the diameter direction from the end part of the one side in the axial direction of the first extending and exiting part 311A, and a connection part 312A that is formed at the end part located interiorly in the diameter direction of the second extending and exiting part 310A, and is connected to one end part 913a (refer to FIG. 1) of the winding wire 913.

The third feeding terminal part 32A is configured to include a first extending and exiting part 321A that projects toward the another side in the axial direction from the end part in the width direction of the third annular conductor part 30A, a second extending and exiting part 323A that extends exteriorly in the diameter direction from the end part of the one side in the axial direction of the first extending and exiting part 321A, and a connection part 322A that is formed at the end part located exteriorly in the diameter direction of the second extending and exiting part 323A, and is connected to current feeders (not shown).

The fourth bus ring 4A is configured to integrally include a fourth annular conductor part 40A, a plurality of the first to the third neutral phase first connection terminal parts 41A to 43A. The fourth annular conductor part 40A has a polygonal shape configured such that a copper plate having a band-like shape are bent at a plurality (12) of places in the circumferential direction, and is formed so as to have an annular shape as a whole. Parts corresponding to both end parts in the longitudinal direction of the copper plate of a band-like shape face with each other across a void 400A in the circumferential direction. A plurality (8) of the first neutral phase connection terminal parts 41A are configured to include a first extending and exiting part 411A that projects toward the one side in the axial direction from the end part in the width direction of the fourth annular conductor part 40A, a second extending and exiting part 410A that extends interiorly in the diameter direction from the end part of the one side in the axial direction of the first extending and exiting part 411A, and a connection part 412A that is formed at the end part located interiorly in the diameter direction of the second extending and exiting part 410A, and is connected to another end part 911b (refer to FIG. 1) of the winding wire 911. Similarly, a plurality (8) of the second and the third neutral phase connection terminal parts 42A, 43A are configured to include first extending and exiting parts 421A, 431A that project toward the one side in the axial direction from the end part in the width direction of the fourth annular conductor part 40A, second extending and exiting parts 420A, 430A that extend interiorly in the diameter direction from the end part of the one side in the axial direction of the first extending and exiting parts 421A, 431A, and connection parts 422A, 432A that are formed at the end part located interiorly in the diameter direction of the second extending and exiting parts 420A, 430A, and are connected to another end parts 912b, 913b (refer to FIG. 1) of the winding wires 912, 913.

The fourth annular conductor part 40A is arranged at the innermost circumferential side of the first to the fourth annular conductor parts 10A, 20A, 30A, 40A. The first annular conductor part 10A is coaxially arranged at the outer side of the fourth annular conductor part 40A. The second annular conductor part 20A is coaxially arranged at the outer side of the first annular conductor part 10A. The third annular conductor part 30A is coaxially arranged at the outer side of the second annular conductor part 20A.

The first to the third connection terminal parts 11A, 21A, 31A project more interiorly in the diameter direction than the fourth annular conductor part 40A at the one side in the axial direction of the first to the third annular conductor part 10A, 20A, 30A. The first to the third connection parts 112A, 212A, 312A of the first to the third connection terminal parts 11A, 21A, 31A are located more interiorly in the diameter direction than the fourth annular conductor part 40A.

The first to the third feeding terminal parts 12A, 22A, 32A are configured to project more exteriorly in the diameter direction than the third annular conductor part 30A at the another side in the axial direction of the first to the third annular conductor parts 10A, 20A, 30A. The joining parts 122A, 222A, 322A of the first to the third feeding terminal parts 12A, 22A, 32A are located exteriorly in the diameter direction than the third annular conductor part 30A.

In the electric power collection and distribution ring 90A having the above-mentioned configuration, the first to the third bus rings 1A, 2A, 3A are sequentially overlapped with each other from the one side in the diameter direction of the fourth bus ring 4, thereby the first to the fourth annular conductor parts 10A, 20A, 30A, 40A can be arranged in parallel in the diameter direction. Accordingly, similarly to the electric power collection and distribution ring 90 according to the first embodiment, the assembling work of the electric power collection and distribution ring 90A can be easily and shortly carried out.

In addition, the first to the third feeding terminal parts 12A, 22A, 32A project more exteriorly in the diameter direction than the third annular conductor part 30A, thus the electric power collection and distribution ring 90A can be reduced in thickness in the axial direction, for example, in comparison with a case that the first to the third feeding terminal parts 12A, 22A, 32A project toward the another side in the axial direction of the first to the third annular conductor parts 10A, 20A, 30A along the axial direction.

Modification of the Second Embodiment

In the embodiment shown in FIGS. 8A to 8D, the voids 100A, 200A, 300A, 400A are respectively formed at one place in the circumferential direction of each of the first to the fourth annular conductor parts 10A, 20A, 30A, 40A, but not particularly limited to this, the voids 100A, 200A, 300A, 400A can be filled with an electrically-conductive metal, for example, by welding, brazing or the like.

FIG. 9A is a front view schematically showing a modification of the electric power collection and distribution ring 90A according to the second embodiment shown in FIGS. 8A to 8D, the modification being configured such that the both end parts of the copper plates in the voids 100A, 200A, 300A, 400A are joined to each other by an electrically-conductive metal, and FIG. 9B is a partial enlarged view schematically showing the modification. According to the modification, electric current supplied to the first to the third feeding terminal parts 12A, 22A, 32A flows toward any direction in the circumferential direction, starting from the connection parts of the first to the third feeding terminal parts 12A, 22A, 32A and the first to the third annular conductor parts 10A, 20A, 30A, the first to the third annular conductor parts 10A, 20A, 30A can be reduced in width in the axial direction. In addition, even if the voids 100A, 200A, 300A, 400A are filled with an electrically-conductive metal, similarly to the embodiment shown in FIGS. 8A to 8D, the first to the third bus rings 1A, 2A, 3A are sequentially overlapped with each other from the one side in the diameter direction of the fourth bus ring 4, thereby the first to the fourth annular conductor parts 10A, 20A, 30A can be arranged in parallel in the diameter direction.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, the above-mentioned first and second embodiments are configured such that the first to the third connection terminal parts 11, 21, 31, 31A, 21A, 31A project interiorly in the diameter direction of the first to the third annular conductor parts 10, 20, 30, 10A, 20A, 30A, and the first to the third feeding terminal part 12, 22, 32, 12A, 22A, 32A project exteriorly in the diameter direction of the first to the third annular conductor parts 10, 20, 30, 10A, 20A, 30A, but to the contrary, a configuration can be also adopted, that the first to the third connection terminal parts 11, 21, 31, 31A, 21A, 31A project exteriorly in the diameter direction of the first to the third annular conductor parts 10, 20, 30, 10A, 20A, 30A, and the first to the third feeding terminal part 12, 22, 32, 12A, 22A, 32A project interiorly in the diameter direction of the first to the third annular conductor parts 10, 20, 30, 10A, 20A, 30A. In addition, a configuration can be also adopted, that the first to the third feeding terminal part 12, 22, 32, 12A, 22A, 32A project perpendicularly to the circumferential direction of the first to the third annular conductor parts 10, 20, 30, 10A, 20A, 30A at the another side in the axial direction of the first to the third annular conductor parts 10, 20, 30, 10A, 20A, 30A along the axial direction.

SUMMARY OF THE EMBODIMENTS

Hereinafter, technical ideas grasped from the above-mentioned embodiments will be described, incorporating references used in the embodiments herein. However, each reference in the following description does not limit the constitutional elements in the scope of the claims to components particularly shown in the embodiments.

[1] An electric power collection and distribution ring (90, 90A), including a first to a third bus rings (1, 2, 3, 1A, 2A, 3A) configured to collect and distribute electric power from and to winding wires (911, 912, 913) of a plurality of phases, the winding wires (911, 912, 913) constituting a stator (91) configured such that the winding wires (911, 912, 913) are wound up around a plurality of teeth (910) arranged annularly, wherein the first bus ring (1, 1A) includes a first annular conductor part (10, 10A), a plurality of first connection terminal parts (11, 11A) configured to connect the first annular conductor part (10, 10A) and the winding wire (911), and a first feeding terminal part (12, 12A) configured to feed electric power to the first annular conductor part (10, 10A), the second bus ring (2, 2A) includes a second annular conductor part (20, 20A), a plurality of second connection terminal parts (21, 21A) configured to connect the second annular conductor part (20, 20A) and the winding wire (912), and a second feeding terminal part (22, 22A) configured to feed electric power to the second annular conductor part (20, 20A), and the third bus ring (3, 3A) includes a third annular conductor part (30, 30A), a plurality of third connection terminal parts (31, 31A) configured to connect the third annular conductor part (30, 30A) and the winding wire (913), and a third feeding terminal part (32, 32A) configured to feed electric power to the third annular conductor part (30, 30A), wherein the first annular conductor part (10, 10A) and the third annular conductor part (30, 30A) are coaxially arranged in parallel in such a manner that the first annular conductor part (10, 10A) is located at one side in a diameter direction of the second annular conductor part (20, 20A) and the third annular conductor part (30, 30A) is located at another side in a diameter direction of the second annular conductor part (20, 20A), the first to the third connection terminal parts (11, 21, 31, 11A, 21A, 31A) project at one side in an axial direction of the first to the third annular conductor parts (10, 20, 30, 10A, 20A, 30A), toward the one side in the diameter direction than the first annular conductor part (10, 10A), the second feeding terminal part (22, 22A) projects toward another side in an axial direction of the first to the third annular conductor parts (10, 20, 30, 10A, 20A, 30A) without projecting toward the one side in the diameter direction than the first annular conductor part (10, 10A), and the third feeding terminal part (32, 32A) projects toward the another side in the axial direction of the first to the third bus rings (1, 2, 3, 1A, 2A, 3A) without projecting toward the one side in the diameter direction than the second annular conductor part (20, 20A).

[2] The electric power collection and distribution ring (90, 90A) described in [1], wherein the first to the third feeding terminal parts (12, 22, 32, 12A, 22A, 32A) project at the another side in the axial direction of the first to the third bus rings (1, 2, 3, 1A, 2A, 3A), toward the another side in the diameter direction than the third annular conductor part (30, 30A).

[3] The electric power collection and distribution ring (90) described in [1], wherein the first to the third annular conductor parts (10, 20, 30) is comprised of an insulated electric wire configured such that an insulation coating (102, 202, 302) is formed on an outer periphery of a center conductor (101, 201, 301), the first to the third connection terminal parts (11, 21, 31) include a first connection part (111, 211, 311) configured to be connected to the center conductor (101, 201, 301), a second connection part (112, 212, 312) configured to be connected to the winding wires (911, 912, 913), a first extending and exiting part (114, 214, 314) configured to extend and exit from the side of the first connection part (111, 211, 311) to the one side in the axial direction, and a second extending and exiting part (115, 215, 315) configured to extend and exit from an end part of the first extending and exiting part (114, 214, 314) to the one side in the diameter direction, toward the side of the second connection part (112, 212, 312), and the first connection part (111, 211, 311) includes a pair of protrusions (111a, 111b, 211a, 211b, 311a, 311b) configured to face each other across the center conductor (101, 201, 301) and be contact with the center conductor (101, 201, 301).

[4] The electric power collection and distribution ring (90) described in [3], wherein the first to the third connection parts (11, 21, 31) include an extending portion (113, 213, 313) configured to extend along a circumferential direction of the first to the third annular conductor parts (10, 20, 30) between the first connection part (111, 211, 311) and the first extending and exiting part (114, 214, 314).

[5] The electric power collection and distribution ring (90) described in [2], wherein the first to the third annular conductor parts (10, 20, 30) are comprised of an insulated electric wire configured such that an insulation coating (102, 202, 302) is formed on an outer periphery of a center conductor (101, 201, 301), the first and the second feeding terminal parts (12, 22) include a first connection part (121, 221, 321) configured to be connected to the center conductor (101, 201, 301), a second connection part (122, 222, 322) configured to project toward the another side in the diameter direction than the third annular conductor part (30) so as to be connected to current feeders and a joining part (123, 223, 323) configured to join the first connection part (121, 221, 321) and the second connection part (122, 222, 322), the joining part (123, 223, 323) has a stepped shape in which a level difference part (123a, 223a, 323a) is formed, the level difference part (123a, 223a, 323a) configured such that the side of the second connection part (122, 222, 322) is dislocated toward the another side in the axial direction so as to have a level difference larger than a thickness of the insulation coating (102, 202, 302), the first feeding terminal part (12) is configured such that the level difference part (123a) is formed closer to the one side of the diameter direction than the second and the third annular conductor parts (20, 30), and the second feeding terminal part (22) is configured such that the level difference part (223a) is formed closer to the one side of the diameter direction than the third annular conductor part (30).

[6] An electric motor (9), including the electric power collection and distribution ring (90, 90A) described in [1], a stator (91) including a plurality of teeth (910) and winding wire (911, 912, 913) of a plurality of phases and a rotor (92) configured to rotate relative to the stator (91) by magnetic field of the winding wire (911, 912, 913) of a plurality of phases.

What is claimed is:

1. An electric power collection and distribution ring, comprising:
    a first to a third bus rings configured to collect and distribute electric power from and to winding wires of a plurality of phases, the winding wires constituting a stator configured such that the winding wires are wound up around a plurality of teeth arranged annularly,
    wherein the first bus ring comprises a first annular conductor part comprising an insulated electric wire comprising a center conductor and an insulation coating formed on an outer periphery of the center conductor, a plurality of first connection terminal parts configured to connect the first annular conductor part and the winding wire, and a first feeding terminal part configured to feed electric power to the first annular conductor part,
    wherein the second bus ring comprises a second annular conductor part comprising an insulated electric wire comprising a center conductor and an insulation coating formed on an outer periphery of the center conductor, a plurality of second connection terminal parts configured to connect the second annular conductor part and the winding wire, and a second feeding terminal part configured to feed electric power to the second annular conductor part,
    wherein the third bus ring comprises a third annular conductor part comprising an insulated electric wire comprising a center conductor and an insulation coating formed on an outer periphery of the center conductor, a plurality of third connection terminal parts configured to connect the third annular conductor part and the winding wire, and a third feeding terminal part configured to feed electric power to the third annular conductor part, wherein the first annular conductor part and the third annular conductor part are coaxially arranged in parallel in such a manner that the first annular conductor part is located at one side in a diameter direction of the second annular conductor part and the third annular conductor part is located at another side in a diameter direction of the second annular conductor part, wherein the first to the third connection terminal parts project at one side in an axial direction of the first to the third annular conductor parts, toward the one side in the diameter direction than the first annular conductor part, wherein the first feeding terminal part comprises a first connection part sandwiching the center conductor of the first annular conductor part in the axial direction to be connected to the center conductor of the first annular conductor part, a second connection part configured to project toward the another side in the diameter direction than the third annular conductor part so as to be connected to current feeders and a joining part configured to join the first connection part and the second connection part, wherein the second connection part and the joining part project at the another side in the axial direction toward the another side in the diameter direction without projecting toward the one side in the axial direction, wherein the second feeding terminal part comprises a first connection part sandwiching the center conductor of the second annular conductor part in the axial direction to be connected to the center conductor of the second annular conductor part, a second connection part configured to project toward the another side in the diameter direction than the third annular conductor part so as to be connected to current feeders and a joining part configured to join the first connection part and the second connection part, wherein the second feeding terminal part projects toward another side in an axial direction of the first to the third annular conductor parts without projecting toward the one side in the diameter direction than the first annular conductor part, wherein the second connection part and the joining part project at the another side in the axial direction toward the another side in the diameter direction without projecting toward the one side in the axial direction, and wherein the third feeding terminal part comprises a first connection part sandwiching the center conductor of the third annular conductor part in the axial direction to be connected to the center conductor of the third annular conductor part, a second connection part configured to project toward the another side in the diameter direction than the third annular conductor part so as to be connected to current feeders and a joining part configured to join the first connection part and the second connection part, wherein the third feeding terminal part projects toward the another side in the axial direction of the first to the third annular conductor parts without projecting toward the one side in the diameter direction than the second annular conductor part, wherein the second connection part and the joining part project at the another side in the axial direction toward the another side in the diameter direction without projecting toward the one side in the axial direction.

2. The electric power collection and distribution ring according to claim 1, wherein the first to the third connection terminal parts comprise a first connection part configured to be connected to the center conductor, a second connection part configured to be connected to the winding wire, a first extending and exiting part configured to extend and exit from the side of the first connection part to the one side in the axial direction, and a second extending and exiting part configured to extend and exit from an end part of the first extending and exiting part to the one side in the diameter direction, toward the side of the second connection part, and wherein the first connection part comprises a pair of protrusions configured to face each other across the center conductor and be contact with the center conductor.

3. The electric power collection and distribution ring according to claim 2, wherein the first to the third connection parts comprise an extending portion configured to extend along a circumferential direction of the first to the third annular conductor parts between the first connection part and the first extending and exiting part.

4. The electric power collection and distribution ring according to claim 2, wherein the joining part has a stepped shape in which a level difference part is formed, the level difference part configured such that the side of the second connection part is dislocated toward the another side in the axial direction so as to have a level difference larger than a thickness of the insulation coating, wherein the first feeding terminal part is configured such that the level difference part is formed closer to the one side of the diameter direction than the second and the third annular conductor parts, and wherein the second feeding terminal part is configured such that the level difference part is formed closer to the one side of the diameter direction than the third annular conductor part.

5. The electric power collection and distribution ring according to claim 2, wherein each of the first to the third feeding terminal parts comprises a substantially J-shape in a cross section.

6. The electric power collection and distribution ring according to claim 1, wherein the joining part has a stepped shape in which a level difference part is formed, the level difference part configured such that the side of the second connection part is dislocated toward the another side in the axial direction so as to have a level difference larger than a thickness of the insulation coating, wherein the first feeding terminal part is configured such that the level difference part is formed closer to the one side of the diameter direction than the second and the third annular conductor parts, and wherein the second feeding terminal part is configured such that the level difference part is formed closer to the one side of the diameter direction than the third annular conductor part.

7. The electric power collection and distribution ring according to claim 6, wherein each of the first to the third feeding terminal parts comprises a substantially J-shape in a cross section.

8. An electric motor, comprising:
the electric power collection and distribution ring according to claim 1;
a stator comprising a plurality of teeth and winding wire of a plurality of phases; and
a rotor configured to rotate relative to the stator by magnetic field of the winding wire of a plurality of phases.

9. The electric power collection and distribution ring according to claim 1, wherein the first connection part bridges a gap in the center conductor of the first, second and third annular conductor parts.

10. The electric power collection and distribution ring according to claim 1, wherein the first connection part is connected to either side of the center conductor of the first, second and third annular conductor parts in the axial direction.

* * * * *